United States Patent
Yoshida

(10) Patent No.: US 11,256,456 B2
(45) Date of Patent: Feb. 22, 2022

(54) IMAGE FORMING APPARATUS CAPABLE OF LIMITING PRINTING BASED ON NUMBER OF OUTPUT SHEETS, IMAGE FORMING METHOD

(71) Applicant: KYOCERA Document Solutions Inc., Osaka (JP)

(72) Inventor: Toshinobu Yoshida, Osaka (JP)

(73) Assignee: KYOCERA Document Solutions Inc., Osaka (JP)

(*) Notice: Subject to any disclaimer, the term of this patent is extended or adjusted under 35 U.S.C. 154(b) by 0 days.

(21) Appl. No.: 16/996,713

(22) Filed: Aug. 18, 2020

(65) Prior Publication Data
US 2021/0055899 A1 Feb. 25, 2021

(30) Foreign Application Priority Data
Aug. 21, 2019 (JP) .............................. JP2019-150818

(51) Int. Cl.
*G06F 3/12* (2006.01)

(52) U.S. Cl.
CPC .......... *G06F 3/1239* (2013.01); *G06F 3/1219* (2013.01)

(58) Field of Classification Search
None
See application file for complete search history.

(56) References Cited

U.S. PATENT DOCUMENTS

| | | | | |
|---|---|---|---|---|
| 2013/0271785 A1* | 10/2013 | Sakata | ............... | G03G 15/5079 358/1.15 |
| 2016/0062291 A1* | 3/2016 | Tao | ................... | G03G 15/6514 399/80 |
| 2016/0231686 A1* | 8/2016 | Itoh | ...................... | G03G 15/502 |
| 2020/0117407 A1* | 4/2020 | Yoshimura | ............... | B41J 29/46 |
| 2020/0192268 A1* | 6/2020 | Wakana | ............ | G03G 15/6502 |

FOREIGN PATENT DOCUMENTS

JP 2017032699 A 2/2017

* cited by examiner

*Primary Examiner* — Fan Zhang
(74) *Attorney, Agent, or Firm* — Alleman Hall Creasman & Tuttle LLP

(57) ABSTRACT

An image forming apparatus includes a plurality of sheet placement portions, a count processing portion, and a limitation processing portion. The count processing portion counts a cumulative number of output prints that are output by executions of print jobs during a predetermined unit time period. When a sum of a number of prints to be output by a processing-target print job and the cumulative number of output prints exceeds a predetermined upper-limit number of sheets, the limitation processing portion limits an execution of the processing-target print job when a sheet supply source of the processing-target print job is not a specific sheet placement portion among the plurality of sheet placement portions, and permits the execution of the processing-target print job when the sheet supply source is the specific sheet placement portion.

7 Claims, 3 Drawing Sheets

IMAGE FORMING APPARATUS CAPABLE OF LIMITING PRINTING BASED ON NUMBER OF OUTPUT SHEETS, IMAGE FORMING METHOD

INCORPORATION BY REFERENCE

This application is based upon and claims the benefit of priority from the corresponding Japanese Patent Application No. 2019-150818 filed on Aug. 21, 2019, the entire contents of which are incorporated herein by reference.

BACKGROUND

The present disclosure relates to an image forming apparatus and an image forming method.

There is known an image forming apparatus, such as a printer, that is configured to form an image on a sheet. In addition, there is known an image forming apparatus that is configured to, in order to reduce the cost of a consumable, limit an execution of a print job when the execution of the print job is to cause a cumulative number of output prints to exceed a predetermined upper-limit number of sheets in a unit time period.

SUMMARY

An image forming apparatus according to an aspect of the present disclosure includes a plurality of sheet placement portions, a count processing portion, and a limitation processing portion. The count processing portion counts a cumulative number of output prints that are output by executions of print jobs during a predetermined unit time period. When a sum of a number of prints to be output by a processing-target print job and the cumulative number of output prints exceeds a predetermined upper-limit number of sheets, the limitation processing portion limits an execution of the processing-target print job when a sheet supply source of the processing-target print job is not a specific sheet placement portion among the plurality of sheet placement portions, and permits the execution of the processing-target print job when the sheet supply source is the specific sheet placement portion.

An image forming method according to another aspect of the present disclosure is executed in an image forming apparatus including a plurality of sheet placement portions. The image forming method includes: counting a cumulative number of output prints that are output by executions of print jobs during a predetermined unit time period; and when a sum of a number of prints to be output by a processing-target print job and the cumulative number of output prints exceeds a predetermined upper-limit number of sheets, limiting an execution of the processing-target print job when a sheet supply source of the processing-target print job is not a specific sheet placement portion among the plurality of sheet placement portions, and permitting the execution of the processing-target print job when the sheet supply source is the specific sheet placement portion.

This Summary is provided to introduce a selection of concepts in a simplified form that are further described below in the Detailed Description with reference where appropriate to the accompanying drawings. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

DETAILED DESCRIPTION

The following describes an embodiment of the present disclosure with reference to the accompanying drawings. It should be noted that the following embodiment is an example of a specific embodiment of the present disclosure and should not limit the technical scope of the present disclosure.

Configuration of Image Forming Apparatus 10

Figure 1:
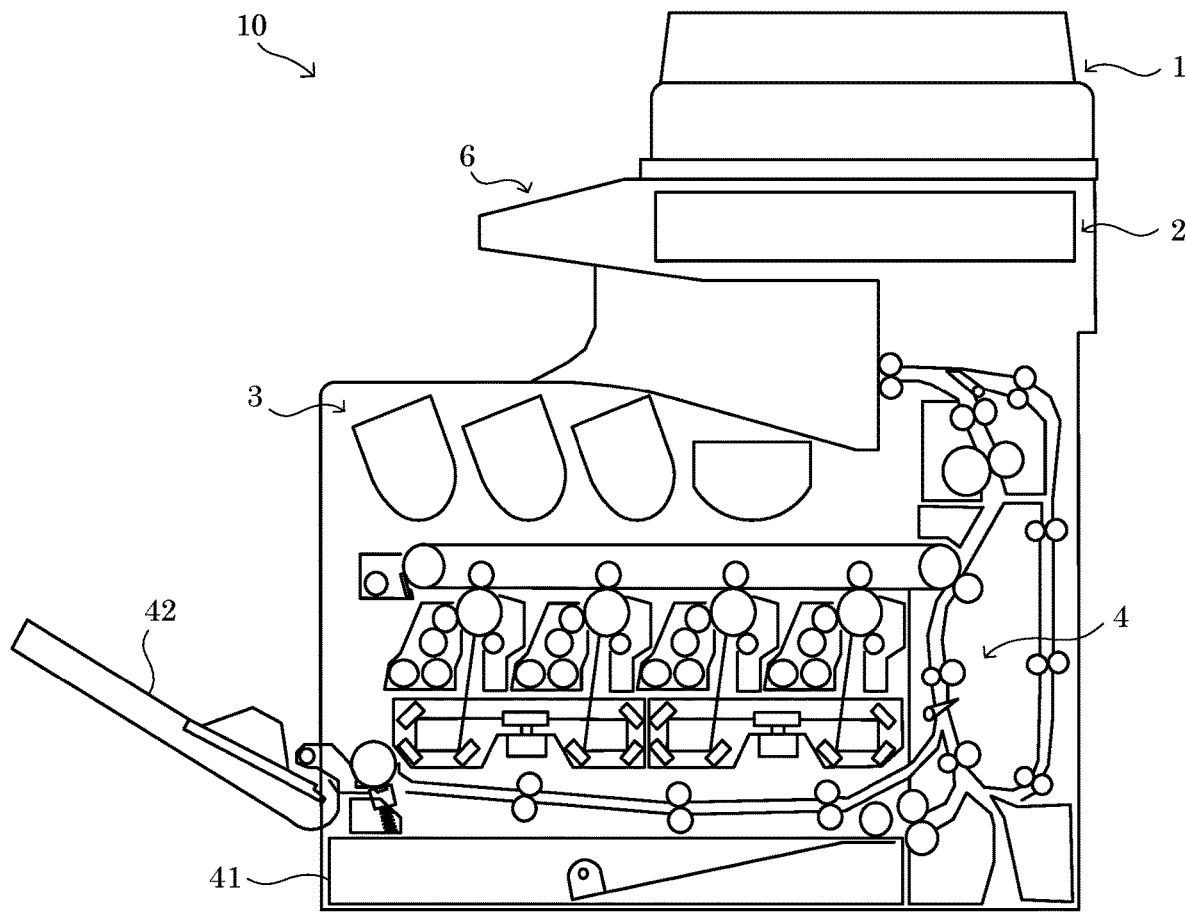
FIG. 1 is a diagram showing a configuration of an image forming apparatus according to an embodiment of the present disclosure.
Figure 2:
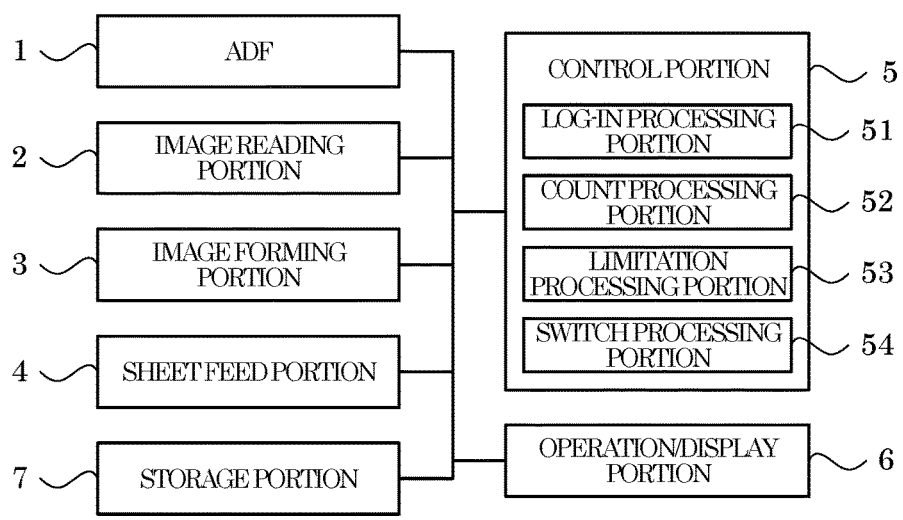
FIG. 2 is a block diagram showing a system configuration of the image forming apparatus according to the embodiment of the present disclosure.

First, a description is given of a configuration of an image forming apparatus 10 according to an embodiment of the present disclosure with reference to FIG. 1 and FIG. 2. Here, FIG. 1 is a cross-section diagram showing the configuration of the image forming apparatus 10.

The image forming apparatus 10 is configured to execute a print job for printing a document sheet. For example, the image forming apparatus 10 is a multifunction peripheral having a plurality of functions such as a scan function for reading image data from a document sheet, a print function for forming an image based on image data, a facsimile function, and a copy function. It is noted that the image forming apparatus 10 may be a printer, a facsimile apparatus, or a copier.

As shown in FIG. 1 and FIG. 2, the image forming apparatus 10 includes an ADF 1, an image reading portion 2, an image forming portion 3, a sheet feed portion 4, a control portion 5, an operation/display portion 6, and a storage portion 7.

The ADF 1 includes a document sheet setting portion, a plurality of conveyance rollers, a document sheet pressing, and a sheet discharge portion, and conveys a document sheet so that the document sheet is read by the image reading portion 2.

The image reading portion 2 includes a document sheet table, a light source, a plurality of mirrors, an optical lens, and a CCD, and is configured to read image data from a document sheet.

The image forming portion 3 is configured to form a color or monochrome image on a sheet by an electrophotographic method based on image data read by the image reading portion 2. In addition, the image forming portion 3 is configured to form an image on a sheet based on image data input from an external information processing apparatus. Specifically, the image forming portion 3 includes a plurality of image forming units, a laser scanning unit (LSU), an intermediate transfer belt, a secondary transfer roller, a fixing device, and a sheet discharge tray. It is noted that the image forming portion 3 may form an image by another image forming method such as an inkjet method.

The sheet feed portion 4 includes a sheet feed cassette 41, a manual feed tray 42, and a plurality of conveyance rollers. The sheet feed cassette 41 preliminarily stores sheets that are prepared by a manager of the image forming apparatus 10 or the like. A user places, on the manual feed tray 42, sheets that are prepared by the user himself/herself. The sheet feed portion 4 supplies sheets stored in the sheet feed cassette 41 or sheets placed on the manual feed tray 42 one by one to the image forming portion 3. The image forming portion 3 forms an image on a sheet supplied from the sheet feed portion 4 based on image data. Here, the sheet feed cassette 41 and the manual feed tray 42 are an example of a plurality of sheet placement portions of the present disclosure.

The control portion 5 includes control equipment such as a CPU 5A, a ROM 5B, and a RAM 5C. The CPU 5A is a processor that executes various calculation processes. The ROM 5B is a nonvolatile storage device in which various information such as control programs for causing the CPU 5A to execute various processes are preliminarily stored. The RAM 5C is a volatile storage device that is used as a temporary storage memory (working area) for the various processes executed by the CPU 5A. In the control portion 5, the CPU 5A executes the various control programs preliminarily stored in the ROM 5B. This allows the image forming apparatus 10 to be controlled comprehensively by the control portion 5. It is noted that the control portion 5 may be formed as an electronic circuit such as an integrated circuit (ASIC), and may be a control portion provided independently of a main control portion that comprehensively controls the image forming apparatus 10.

The operation/display portion 6 includes a display portion and an operation portion. The display portion is, for example, a liquid crystal display and displays various types of information in response to control instructions from the control portion 5. The operation portion is composed of, for example, operation keys or a touch panel through which various types of information are input to the control portion 5 in response to user operations.

The storage portion 7 is a nonvolatile storage device. For example, the storage portion 7 is a storage device such as: a nonvolatile memory such as a flash memory or an EEPROM; an SSD (Solid State Drive); or an HDD (Hard Disk Drive).

The storage portion 7 preliminarily stores authentication information that corresponds to the users of the image forming apparatus 10. The authentication information is used by the image forming apparatus 10 for authentication of each user. For example, each piece of authentication information is composed of a user name and a password. It is noted that the authentication information may be associated with identification information of an external information processing apparatus that may transmit a print job to the image forming apparatus 10.

Meanwhile, there is known an image forming apparatus that is configured to, in order to reduce the cost of a consumable such as toner, limit an execution of a print job when the execution of the print job is to cause a cumulative number of output prints to exceed a predetermined upper-limit number of sheets in a unit time period.

However, if an execution of a print job is always limited when the execution of the print job is to cause a cumulative number of output prints to exceed an upper-limit number in a unit time period, it should be inconvenient for the user. On the other hand, as described below, the image forming apparatus 10 according to the embodiment of the present disclosure is configured to reduce the cost of a consumable, while preventing the cost reduction from decreasing the convenience.

Specifically, the ROM 5B of the control portion 5 preliminarily stores a print control program for causing the CPU 5A of the control portion 5 to execute a print control process (see the flowchart of FIG. 3) that is described below. It is noted that the print control program may be recorded on a non-transitory computer-readable recording medium such as a CD, a DVD, or a flash memory, and may be read from the recording medium and installed in the storage portion 7.

As shown in FIG. 2, the control portion 5 includes a log-in processing portion 51, a count processing portion 52, a limitation processing portion 53, and a switch processing portion 54. Specifically, the control portion 5 executes, by using the CPU 5A, the print control program stored in the ROM 5B. This allows the control portion 5 to function as the log-in processing portion 51, the count processing portion 52, the limitation processing portion 53, and the switch processing portion 54.

The log-in processing portion 51 executes a log-in process to authenticate a user based on a predetermined authentication operation.

For example, the log-in processing portion 51 displays, as necessary on the operation/display portion 6, an authentication screen on which the authentication operation can be performed. The log-in processing portion 51 receives the authentication operation on the authentication screen when the operation is performed by the user. For example, the authentication operation is an operation to input log-in information such as a user name and a password. Subsequently, when the information input through the operation/display portion 6 matches any one piece of authentication information stored in the storage portion 7, the log-in processing portion 51 determines that the authentication is successful, and permits the user to log in the image forming apparatus 10. It is noted that the log-in processing portion 51 executes a log-out process to log out a currently logged-in user when a predetermined log-out operation has been performed on the operation/display portion 6, when a predetermined set time has passed, or when another user should be logged in.

The count processing portion 52 is configured to count, for each user who has a possibility to log in the image forming apparatus 10, the cumulative number of output prints, namely, a total number of prints that are output by executions of color print jobs during the unit time period. For example, the unit time period is one month. It is noted that the unit time period may be an arbitrarily set period.

The limitation processing portion 53 is configured to limit an execution of a color print job when the sum of: the number of prints to be output by the color print job; and the cumulative number of output prints of a user who has currently logged in the image forming apparatus 10, exceeds the upper-limit number of sheets.

Specifically, the limitation processing portion 53 limits an execution of a color print job when a sheet supply source of the color print job is not the manual feed tray 42 (an example of a specific sheet placement portion of the present disclosure). In addition, the limitation processing portion 53 can permit an execution of a color print job when a sheet supply source of the color print job is the manual feed tray 42.

For example, when the sum of the number of prints to be output by a processing-target color print job and the cumulative number of output prints exceeds the upper-limit number of sheets, and the sheet supply source of the color print job is the manual feed tray 42, the limitation processing portion 53 determines whether or not to permit an execution of the color print job, based on an amount of toner (an example of developer of the present disclosure) to be consumed by the color print job. For example, the limitation processing portion 53 limits an execution of the color print job when the amount of toner to be consumed by the color print job exceeds a predetermined upper-limit amount, and permits the execution of the color print job when the amount of toner to be consumed by the color print job is equal to or lower than the upper-limit amount.

It is noted that the upper-limit amount may be determined for each color of toner, or may be determined regardless of the color of toner. In addition, the upper-limit amount may be an arbitrarily determined amount. In addition, the amount of toner to be consumed by the color print job may be obtained by a well-known method based on image data that is to be printed by the color print job. It is noted that in a case where the image forming portion 3 forms an image by an inkjet method, ink is another example of the developer of the present disclosure.

In addition, when the sum of the number of prints to be output by a processing-target color print job and the cumulative number of output prints exceeds the upper-limit number of sheets, and the sheet supply source of the color print job is the manual feed tray 42, the limitation processing portion 53 determines whether or not to permit an execution of the color print job, based on the number of times by which a currently logged-in user is allowed to execute the color print job during the unit time period. For example, the limitation processing portion 53 limits an execution of the color print job when the number of times by which the color print job is allowed to be executed during the unit time period exceeds a predetermined upper-limit number of times, and permits the execution of the color print job when the number of times by which the color print job is allowed to be executed during the unit time period is equal to or lower than the upper-limit number of times. It is noted that the upper-limit number of times may be an arbitrarily determined number of times.

It is noted that when the sum of the number of prints to be output by a processing-target color print job and the cumulative number of output prints exceeds the upper-limit number of sheets, and the sheet supply source of the color print job is the manual feed tray 42, the limitation processing portion 53 may permit an execution of the color print job regardless of the amount of toner to be consumed by the color print job.

In addition, when the sum of the number of prints to be output by a processing-target color print job and the cumulative number of output prints exceeds the upper-limit number of sheets, and the sheet supply source of the color print job is the manual feed tray 42, the limitation processing portion 53 may permit an execution of the color print job regardless of the number of times by which the color print job is allowed to be executed during the unit time period.

The switch processing portion 54 is configured to switch the sheet supply source from the manual feed tray 42 to the sheet feed cassette 41 when the manual feed tray 42 has run out of sheets during an execution of a color print job permitted by the limitation processing portion 53.

For example, the switch processing portion 54 switches the sheet supply source to the sheet feed cassette 41 when the number of sheets that remain to be printed by the color print job is equal to or lower than a predetermined allowed number of sheets. In addition, the switch processing portion 54 stops the execution of the color print job when the number of sheets that remain to be printed by the color print job exceeds the allowed number of sheets. It is noted that the allowed number of sheets may be determined based on the number of prints to be output by the color print job. For example, the allowed number of sheets may be ten percent of the number of prints to be output by the color print job. In addition, the allowed number of sheets may be an arbitrarily determined number of sheets.

It is noted that the control portion 5 may not include the log-in processing portion 51. In this case, the count processing portion 52 may count, without identifying the user, the cumulative number of prints that are output by executions of color print jobs during the unit time period. In addition, the limitation processing portion 53 may limit an execution of the color print job without identifying the user.

In addition, the control portion 5 may not include the switch processing portion 54.

Print Control Process

Figure 3:
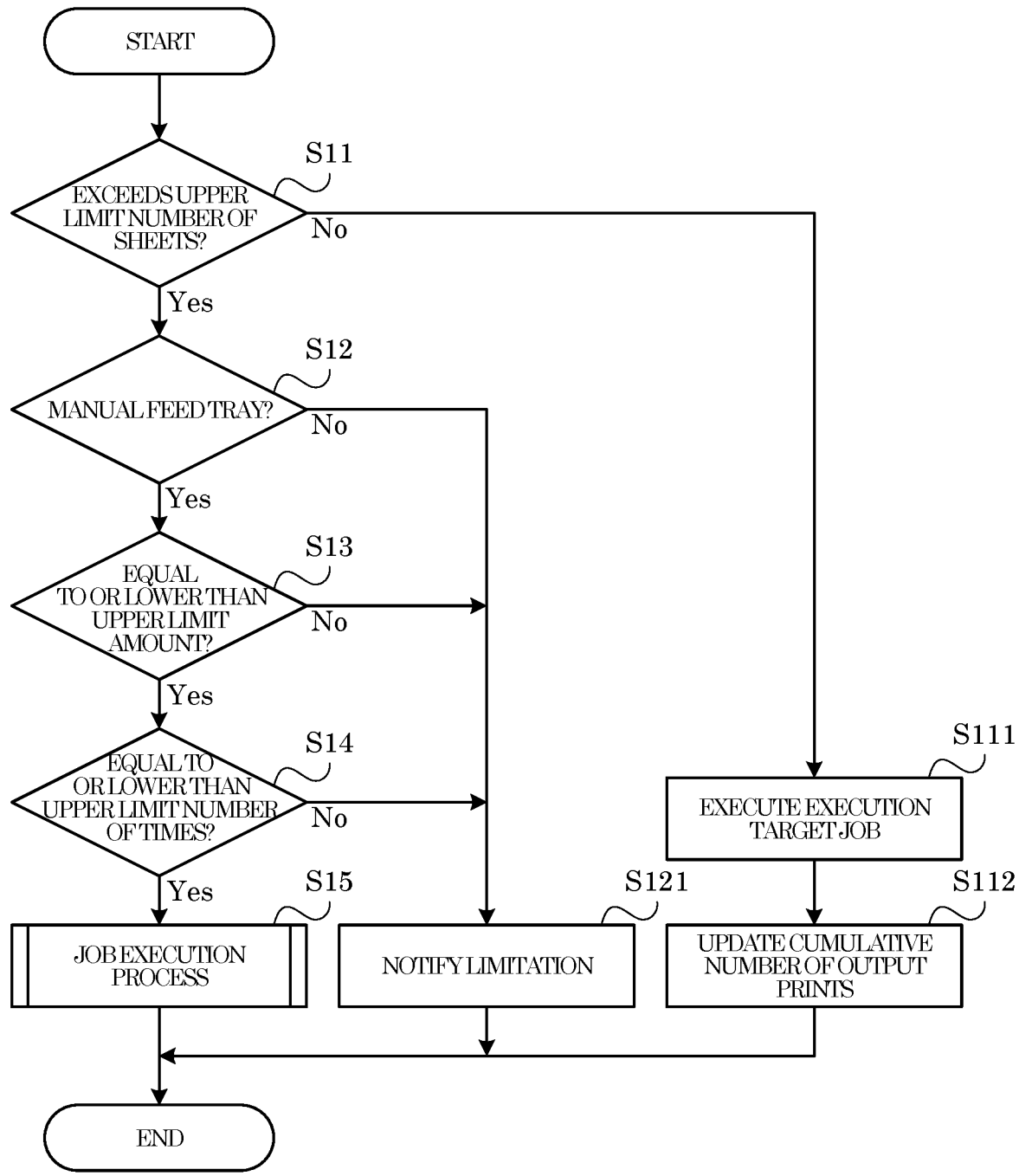
FIG. 3 is a flowchart showing an example of a print control process executed by the image forming apparatus according to the embodiment of the present disclosure.

In the following, with reference to FIG. 3, a description is given of an example of the procedure of the print control process executed by the control portion 5 in the image forming apparatus 10. Here, steps S11, S12, . . . represent numbers assigned to the processing procedures (steps) executed by the control portion 5.

It is noted that the print control process is executed when a user who has logged in the image forming apparatus 10 inputs an instruction to execute a color print job by performing an operation on the operation/display portion 6. Hereinafter, the color print job instructed to be executed is referred to as an execution target job.

It is noted that the print control process may be executed when an instruction to execute a color print job has been input from an external information processing apparatus.

Step S11

First, in step S11, the control portion 5 determines whether or not the sum of the number of prints to be output by the execution target job and the cumulative number of output prints of a currently logged-in user exceeds the upper-limit number of sheets.

Here, upon determining that the sum of the number of prints to be output by the execution target job and the cumulative number of output prints of the currently logged-in user exceeds the upper-limit number of sheets (Yes side at S11), the control portion 5 moves the process to step S12. In addition, upon determining that the sum of the number of prints to be output by the execution target job and the cumulative number of output prints of the currently logged-in user does not exceed the upper-limit number of sheets (No side at S11), the control portion 5 moves the process to step S111.

It is noted that when an instruction to execute a color print job has been input from an external information processing apparatus, the control portion 5 determines whether or not the sum of the number of prints to be output by the color print job and the cumulative number of output prints of a user associated with identification information of the information processing apparatus exceeds the upper-limit number of sheets.

Step S111

In step S111, the control portion 5 executes the execution target job.

Step S112

In step S112, the control portion 5 updates the cumulative number of output prints corresponding to the currently logged-in user, based on the number of prints output by the execution target job executed in step S111. Here, the process of step S112 is executed by the count processing portion 52 of the control portion 5.

Step S12

In step S12, the control portion 5 determines whether or not a sheet supply source of the execution target job is the manual feed tray 42.

Here, upon determining that the sheet supply source of the execution target job is the manual feed tray 42 (Yes side at S12), the control portion 5 moves the process to step S13. In addition, upon determining that the sheet supply source of the execution target job is not the manual feed tray 42 (No side at S12), the control portion 5 moves the process to step S121.

Step S121

In step S121, the control portion 5 notifies that the execution of the execution target job is limited. It is noted that the control portion 5 may notify that the execution of the execution target job will be permitted if the sheet supply source is changed to the manual feed tray 42.

Step S13

In step S13, the control portion 5 determines whether or not an amount of toner to be consumed by the execution target job is equal to or lower than the upper-limit amount.

Here, upon determining that the amount of toner to be consumed by the execution target job is equal to or lower than the upper-limit amount (Yes side at S13), the control portion 5 moves the process to step S14. In addition, upon determining that the amount of toner to be consumed by the execution target job is not equal to or lower than the upper-limit amount (No side at S13), the control portion 5 moves the process to step S121. In this case, in step S121, the control portion 5 may notify that the execution of the execution target job is limited since the amount of toner to be consumed by the execution target job exceeds the upper-limit amount.

Step S14

In step S14, the control portion 5 determines whether or not the number of times by which the currently logged-in user is allowed to execute the execution target job during the unit time period is equal to or lower than the upper-limit number of times. Here, the processes of steps S11 to S14 are executed by the limitation processing portion 53 of the control portion 5.

Here, upon determining that the number of times by which the currently logged-in user is allowed to execute the execution target job during the unit time period is equal to or lower than the upper-limit number of times (Yes side at S14), the control portion 5 moves the process to step S15. In addition, upon determining that the number of times by which the currently logged-in user is allowed to execute the execution target job during the unit time period is not equal to or lower than the upper-limit number of times (No side at S14), the control portion 5 moves the process to step S121.

In this case, in step S121, the control portion 5 may notify that the execution of the execution target job is limited since the number of times by which the currently logged-in user is allowed to execute the execution target job during the unit time period exceeds the upper-limit number of times.

Step S15

In step S15, the control portion 5 executes a job execution process that is described below.

Job Execution Process

Figure 4:
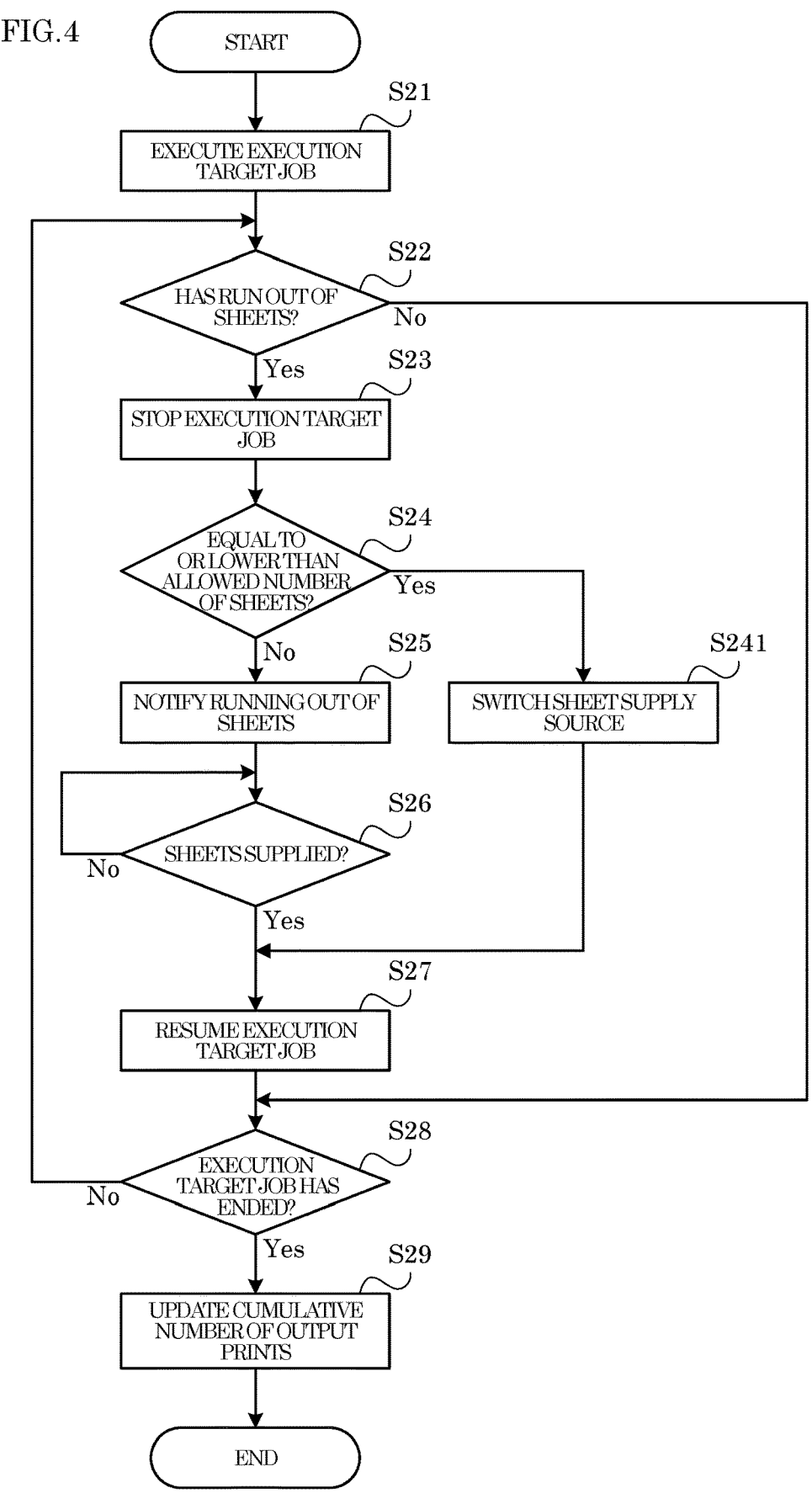
FIG. 4 is a flowchart showing an example of a job execution process executed by the image forming apparatus according to the embodiment of the present disclosure.

Next, with reference to FIG. 4, the job execution process executed in step S15 of the print control process is described.

Step S21

In step S21, the control portion 5 executes the execution target job.

Step S22

In step S22, the control portion 5 determines whether or not the manual feed tray 42 has run out of sheets.

For example, a sheet sensor (not shown) that can detect whether or not there is a sheet, is provided in the manual feed tray 42. The control portion 5 is configured to detect, by using the sheet sensor, whether or not the manual feed tray 42 has run out of sheets.

Here, upon determining that the manual feed tray 42 has run out of sheets (Yes side at S22), the control portion 5 moves the process to step S23. In addition, upon determining that the manual feed tray 42 has not run out of sheets (No side at S22), the control portion 5 moves the process to step S28.

Step S23

In step S23, the control portion 5 stops the execution of the execution target job.

Step S24

In step S24, the control portion 5 determines whether or not the number of sheets that remain to be printed by the execution target job is equal to or lower than the allowed number of sheets.

Here, upon determining that the number of sheets that remain to be printed by the execution target job is equal to or lower than the allowed number of sheets (Yes side at S24), the control portion 5 moves the process to step S241. In addition, upon determining that the number of sheets that remain to be printed by the execution target job is not equal to or lower than the allowed number of sheets (No side at S24), the control portion 5 moves the process to step S25.

Step S241

In step S241, the control portion 5 switches the sheet supply source from the manual feed tray 42 to the sheet feed cassette 41. Here, the process of step S241 is executed by the switch processing portion 54 of the control portion 5. This makes it possible to save the user the trouble of newly setting sheets in the manual feed tray 42.

Step S25

In step S25, the control portion 5 notifies that the manual feed tray 42 has run out of sheets.

Step S26

In step S26, the control portion 5 determines whether or not sheets have been supplied to the manual feed tray 42.

For example, the control portion 5 is configured to detect, by using the sheet sensor, whether or not sheets have been supplied.

Here, upon determining that sheets have been supplied to the manual feed tray 42 (Yes side at S26), the control portion 5 moves the process to step S27. In addition, upon determining that sheets have not been supplied to the manual feed tray 42 (No side at S26), the control portion 5 waits at step S25 for sheets to be supplied.

Step S27

In step S27, the control portion 5 resumes the execution of the execution target job.

Step S28

In step S28, the control portion 5 determines whether or not the execution target job has ended.

Here, upon determining that the execution target job has ended (Yes side at S28), the control portion 5 moves the process to step S29. In addition, upon determining that the execution target job has not ended (No side at S28), the control portion 5 moves the process to step S22.

Step S29

In step S29, the control portion 5 updates the cumulative number of output prints corresponding to the currently logged-in user, based on the number of prints output by the execution target job executed in step S21. Here, the process of step S29 is executed by the count processing portion 52 of the control portion 5.

As described above, even when an execution of a color print job is to cause the cumulative number of output prints to exceed the upper-limit number of sheets, the image forming apparatus 10 permits the execution of the color print job on condition that the sheet supply source of the color print job is the manual feed tray 42. With this configuration, even when an execution of a color print job is to cause the cumulative number of output prints to exceed the upper-limit number of sheets, the user of the image forming apparatus 10 can execute the color print job by setting the sheet supply source of the color print job to the manual feed tray 42 and preparing the sheets used in the printing by the user himself/herself. In addition, the manager of the image forming apparatus 10 may, for example, lock the sheet feed cassette 41 to prohibit sheets from being taken out therefrom such that the user bares part of the cost of a color print job when the execution of the color print job is to cause the cumulative number of output prints to exceed the upper-limit number of sheets. It is therefore possible to reduce the cost of a consumable, while preventing the cost reduction from decreasing the convenience.

It is noted that the count processing portion 52 may count the cumulative number of output prints that are output by executions of color print jobs that do not use the double-sided printing function during the unit time period. In this case, the limitation processing portion 53 may limit an execution of a color print job that does not use the double-sided printing function, instead of a general color print job. In addition, the count processing portion 52 may count the cumulative number of output prints that are output by executions of color print jobs that do not use the collective printing function during the unit time period. In this case, the limitation processing portion 53 may limit an execution of a color print job that does not use the collective printing function. The collective printing function is a function to print images of a plurality of pages collectively on one surface of a sheet. In addition, the count processing portion 52 may count the cumulative number of output prints that are output by executions of all types of print jobs during the unit time period. In this case, the limitation processing portion 53 may limit executions of all types of print jobs.

It is to be understood that the embodiments herein are illustrative and not restrictive, since the scope of the disclosure is defined by the appended claims rather than by the description preceding them, and all changes that fall within metes and bounds of the claims, or equivalence of such metes and bounds thereof are therefore intended to be embraced by the claims.

The invention claimed is:

1. An image forming apparatus comprising:
   a manual feed tray provided outside the image forming apparatus;
   a sheet feed cassette provided inside the image forming apparatus and configured to be locked to prohibit a sheet from being taken out therefrom;
   a count processing portion configured to count a cumulative number of output prints that are output by executions of print jobs during a predetermined unit time period; and
   a limitation processing portion configured to, when a sum of a number of prints to be output by a processing-target print job and the cumulative number of output prints exceeds a predetermined upper-limit number of sheets:
   determine whether or not a sheet supply source of the processing-target print job is the manual feed tray;
   upon determining that the sheet supply source is not the manual feed tray, limit an execution of the processing-target print job; and
   upon determining that the sheet supply source is the manual feed tray, permit the execution of the processing-target print job.

2. The image forming apparatus according to claim 1, wherein
   when the sum of the number of prints to be output by the processing-target print job and the cumulative number of output prints exceeds the upper-limit number of sheets, and the sheet supply source of the processing-target print job is the manual feed tray, the limitation processing portion does not permit the execution of the processing-target print job when an amount of developer to be consumed by the processing-target print job exceeds a predetermined upper-limit amount.

3. The image forming apparatus according to claim 1, wherein
   when the sum of the number of prints to be output by the processing-target print job and the cumulative number of output prints exceeds the upper-limit number of sheets, and the sheet supply source of the processing-target print job is the manual feed tray, the limitation processing portion does not permit the execution of the processing-target print job when a number of times by which a print job is allowed to be executed during the unit time period exceeds a predetermined upper-limit number of times.

4. The image forming apparatus according to claim 1, further comprising:

a switch processing portion configured to switch the sheet supply source from the manual feed tray to the sheet feed cassette when the manual feed tray has run out of sheets during the execution of the processing-target print job permitted by the limitation processing portion.

5. The image forming apparatus according to claim 1, wherein the processing-target print job is a color print job.

6. The image forming apparatus according to claim 1, further comprising:

a log-in processing portion configured to process log-in of a user, wherein the count processing portion counts the cumulative number of output prints for each user who has a possibility to log in the image forming apparatus, and the limitation processing portion limits the execution of the processing-target print job when the sum of the number of prints to be output by the processing-target print job and the cumulative number of output prints of a user who has currently logged in the image forming apparatus, exceeds the upper-limit number of sheets.

7. An image forming method executed in an image forming apparatus including a manual feed tray provided outside the image forming apparatus, and a sheet feed cassette provided inside the image forming apparatus and configured to be locked to prohibit a sheet from being taken out therefrom, the image forming method comprising:

counting a cumulative number of output prints that are output by executions of print jobs during a predetermined unit time period; and when a sum of a number of prints to be output by a processing-target print job and the cumulative number of output prints exceeds a predetermined upper-limit number of sheets:

determining whether or not a sheet supply source of the processing-target print job is the manual feed tray;

upon determining that the sheet supply source is not the manual feed tray, limiting an execution of the processing-target print job; and upon determining that the sheet supply source is the manual feed tray, permitting the execution of the processing-target print job.

* * * * *